US006872088B2

(12) United States Patent
Watanabe

(10) Patent No.: US 6,872,088 B2

(45) Date of Patent: Mar. 29, 2005

(54) CONNECTOR STRUCTURE AND PORTABLE TERMINAL DEVICE

(75) Inventor: Takaaki Watanabe, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/722,770

(22) Filed: Nov. 25, 2003

(65) Prior Publication Data

US 2004/0157481 A1 Aug. 12, 2004

(30) Foreign Application Priority Data

Nov. 29, 2002 (JP) ........................................ 2002-347071

(51) Int. Cl.[7] ......................... H01R 3/00; H01R 13/52; H04M 1/00

(52) U.S. Cl. ....................... 439/165; 439/271; 439/164; 455/550.1

(58) Field of Search ................................ 439/165, 164, 439/271; 455/550.1, 556.2, 90.3

(56) References Cited

U.S. PATENT DOCUMENTS

| | | | | |
|---|---|---|---|---|
| 5,933,330 A | * | 8/1999 | Beutler et al. | 361/814 |
| 6,497,368 B1 | * | 12/2002 | Friend et al. | 235/472.01 |
| 6,795,552 B1 | * | 9/2004 | Stanush et al. | 379/413.01 |
| 2004/0198417 A1 | * | 10/2004 | Yoda | 455/550.1 |

FOREIGN PATENT DOCUMENTS

| | | |
|---|---|---|
| JP | 2002124779 | 4/2002 |
| JP | 2002134938 | 5/2002 |

* cited by examiner

*Primary Examiner*—Chandrika Prasad

(74) *Attorney, Agent, or Firm*—John J. Skinner, Jr.; Joel E. Lutzker; Schulte Roth & Zabel

(57) ABSTRACT

Connection board is provided at one end of flexible board. Connector is formed on either connection board or circuit board, and connector socket is formed on the other board not having the connector. Connector socket and connector can be electrically connected by joining them together. A sealing member is provided between connection board and circuit board, for tightly sealing the periphery of connector.

10 Claims, 4 Drawing Sheets

CONNECTOR STRUCTURE AND PORTABLE TERMINAL DEVICE

CROSS-REFERENCE TO RELATED APPLICATIONS

This application claims priority from Japanese Patent Application No. 2003-347071 on Nov. 29, 2002.

BACKGROUND OF THE INVENTION

1. Field of the Invention

The present invention relates to a connector structure in which a wiring part that arranged inside a hinge is electrically connected to circuit boards provided in two housings that are joined by the hinge. The present invention further relates to a portable terminal device employing this connector structure.

Priority is claimed to Japanese Patent Application No. 2002-347071, filed Nov. 29, 2002, which is incorporated herein by reference.

2. Description of Related Art

In the case of portable terminal devices that employ a connector structure in which a wiring part arranged inside a hinge is electrically connected to circuit boards provided in two housings that are joined by the hinge, it has been the conventional practice to provide a waterproof wall to each of the seam portions of the hinge, or to provide a water resistant material, such as water resistant packing or water-absorbing tarpaulin, near the hinge inside the housing, in order to prevent water from seeping into the housing through the openings for entry and exit of the wiring parts, as is shown, for example, in Japanese Patent Application Laid-Open (JP-A) No. 2002-134938. In addition, as is shown, for example, in JP-A No. 2002-124779, these wiring parts are held firmly between this water resistant material in order not to be subject to over-tension and slackening during opening and closing of the housings that may damage the connection between the wiring part and the circuit board.

Essential components in the above-described structure will now be explained using FIGS. 5 and 6.

In the portable terminal device 101 shown in FIG. 5, numerical symbols 131 and 132 indicate shaft bearings for hinge 130 that join first housing 110 and second housing 120 openably and closably. On the internal side of shaft bearings 131 and 132, hollow cylindrical members 134 and 135 that communicate with the inside of housings 110 and 120 are also provided in the axial direction of the bearings. A flexible board 150 that passes through these cylindrical members 134 and 135 extends into housings 110 and 120, and electrically connects circuit boards 141 and 142 provided are housed inside housings 110 and 120. Flexible board 150 and circuit board 141 are electrically connected by connector 153. A water resistant member 138 is disposed in housings 110 and 120 so as to seal areas of communication between cylindrical members 134 and 135.

As shown in FIG. 6, water resistant member 138 acts as a partition between hinge 130 and housing 110, and prevents water from seeping into housing 110. In addition, water resistant member 138 is divided in the direction of the thickness of housing 110, thereby holding and fixing flexible board 150 firmly in place.

However, in opening and closing housings 110 and 120, it is difficult to completely prevent water from seeping inside hinge 130, and so, water may penetrate inside hinge 130 and thereby leak inside housings 110 and 120 through gaps around water resistant member 138. As a result, there is a problem in that connector 153 in particular, which is disposed near hinge 130 inside housings 110 and 120, is subject to corrosion. In addition, in order to reduce water adhesion, water resistant member 138 is provided inside housing 110. As a result, connector 153 ends up disposed further inside housing 110 than water resistant member 138, thus reducing the space for disposing the circuits on circuit board 141. This can be quite problematic when there is a limit on the size of circuit board 141, as in the case of portable terminal device 101.

The present invention was conceived in view of the above-described circumstances, and relates to a connector structure, and to a portable terminal device employing the same, in which a wiring part arranged inside a hinge is electrically connected to circuit boards provided in two housings joined by the hinge. It is an object of the present invention to improve the water resistance of the connector and expanding the space for disposing circuits on the circuit board.

SUMMARY OF THE INVENTION

The first aspect of the present invention is a connector structure comprising a circuit board provided in a housing and another circuit board provides in another housing, the housings connected together by a hinge, a wiring part arranged inside of the hinge for electrically connecting the circuit boards to each other, a connection board provided at least at one end portion of the wiring part, a connector provided on one of the connection board and one of the circuit boards, a connector socket electrically coupled to the connector and provided on the other of the connection board and one of the circuit boards, and a sealing member provided on one of the connection board and one of the circuit boards for encompassing the connector, wherein the sealing member contacts to the other of the connection board and one of the circuit boards for sealing the periphery of the connector and the connector socket in a state in which the connector and the connector socket are coupled together.

According to this connector structure, it is possible to prevent the connector from getting wet, even if water seeps into the housing from the hinges. In addition, since it is not necessary to provide a water resistant member inside the housing, the connector can be disposed close to the hinges.

In addition, it is preferable that the connection board is thrust against a housing wall surface so that the connector is pressed into said connector socket.

As a result of this connector structure, the connector and the connector socket can be held firmly in a state of connection by attaching the circuit board in the housing. In this case, the periphery of the connector is sealed by a sealing member.

In addition, it is preferable that the wiring part is a flexible printed-circuit board.

The second aspect of the present invention is a portable terminal device comprising two housings connected together by a hinge, a circuit board provided in a housing and another circuit board provides in another housing, a wiring part arranged inside of the hinge for electrically connecting the circuit boards to each other, a connection board provided at an one end portion of the wiring part, a connector provided at one of the connection board and one of the circuit boards, a connector socket electrically coupled to the connector and provided at the other of the connection board and one of the circuit boards, and a sealing member for sealing the periphery of the connector and the connector socket, the sealing member arranged between the connection board and the circuit board.

The third aspect of the present invention is a portable terminal device has two housings connected together by a hinge, a circuit board provided in a housing and another circuit board provides in another housing, a wiring part arranged inside of the hinge for electrically connecting the circuit boards to each other, a connection board provided at one end portion of the wiring part, a connector provided on one of the connection board and one of the circuit boards, a connector socket electrically coupled to the connector and provided on the other of the connection board and one of the circuit boards, and a sealing member provided on one of the connection board and one of the circuit boards for encompassing the connector, wherein said sealing member contacts to the other of the connection board and one of the circuit boards for sealing the periphery of the connector and the connector socket in a state in which the connector and the connector socket are coupled together.

In addition, it is preferable that the connection board is thrust against a housing wall surface so that the connector is pressed into the connector socket.

In addition, it is preferable that the wiring part is a flexible printed-circuit board.

In addition, it is preferable that the portable terminal device further has a projecting portion for projecting into the hinge at a part of the circuit board, a first rib arranged on the projecting portion, and a second rib arranged on a housing wall surface of one of the housings, in opposition to the first rib, wherein the first and second ribs press to hold the wiring part.

Note that the portable terminal device may be a cellular phone or may be a digital camera.

According to these portable terminal devices, the water resistance of the connector inside the housing is high, loosening of the connector in the opening and closing operation of the housing can be prevented, and the electrical durability and reliability can be improved. In addition, higher performance and reduction in size and cost may also be realized as a result of expanding the space for disposing the circuit boards.

DETAILED DESCRIPTION OF THE INVENTION

Preferred embodiments of the present invention will now be explained with reference to the Figures. Note that the following explanation indicates a cellular telephone which employs the connector structure according to the present invention.

Figure 1:
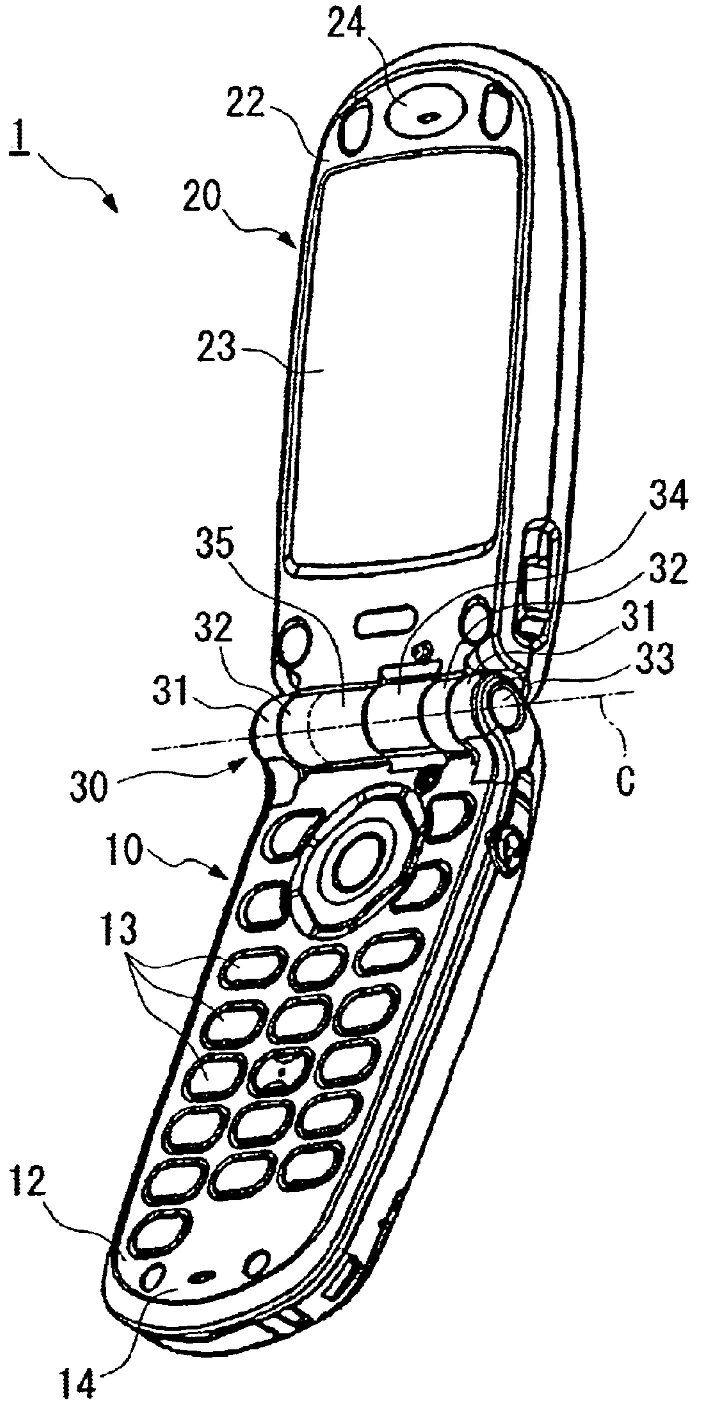
FIG. 1 is a perspective view of the cellular telephone according to an embodiment of the present invention, as seen from the front face.

Cellular telephone 1 (portable terminal device) shown in FIG. 1 is designed as a foldable cellular telephone having a first housing 10 and a second housing 20 which are formed in the shape of a flat, roughly rectangular parallelepiped. These housings 10 and 20 are connected to one another openable and closably via hinge 30. When cellular telephone 1 is closed, the surfaces that lie on top of one another are the respective front faces of housings 10 and 20. A variety of operational buttons 13 and a microphone 14 for communication are disposed on the front face of first housing 10, and a display 23, such as a liquid crystal display, and a speaker 24 for communication are provided on the front face of second housing 20.

Figure 2:
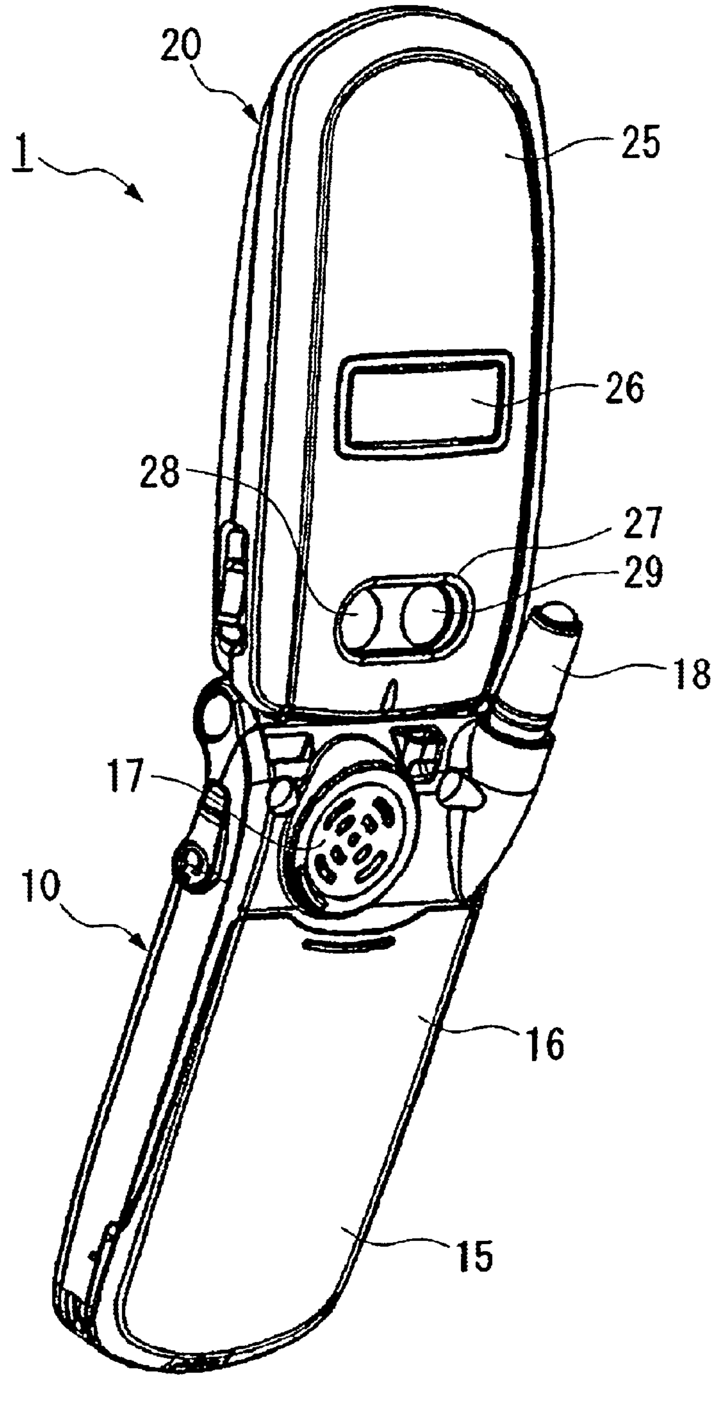
FIG. 2 is a perspective view of the cellular telephone in FIG. 1, as seen from the rear face.

As shown in FIG. 2, a battery 16 which can be attached or released is attached to the back face 15 of first housing 10, and a speaker 17 for ring tone and a retractable antenna 18 are each disposed near hinge 30 on back face 15. A small-scale display 26 such as a liquid crystal display device for showing time and signal is disposed on back face 25 of second housing 20. A window 27 is provided near hinge 30 on back face 25 in which a lens window 28 for a camera module and a mirror 29 useful on capturing a user own image are disposed.

Further, as shown in FIG. 1, hinge 30 has a pair of first shaft bearings 31 that are disposed at both ends of the hinge along the direction of axis C and are formed integrally with first housing 10, and a pair of second shaft bearings 32 that are disposed between first shaft bearings 31 along the direction of axis C and are formed integrally with second housing 20. First housing 10 and second housing 20 is connected openably and closably, by running hinge 33 through these shaft bearings 31 and 32. A first cylindrical member 34, which is formed integrally with first housing 10 shown on the right side of the Figure, and a second cylindrical member 35, which is formed integrally with second housing 20 shown on the left side of the Figure, are disposed between second shaft bearings 32 in the direction of axis C axis. Note that second shaft bearing 32 on the left side of the Figure and second cylindrical member 35 are formed integrally. First shaft bearings 31, second shaft bearings 32, first cylindrical member 34 and second cylindrical member 35 have roughly the same diameter, and are disposed together tightly in close proximity in the direction of axis C to form hinge 30.

First housing 10 and second housing 20 are designed so that they can be separated into a front case and a back case along the direction of the thickness thereof. Various units like display 23 and buttons 13, as well as the circuit board and the like are housed inside these cases.

Figure 3:
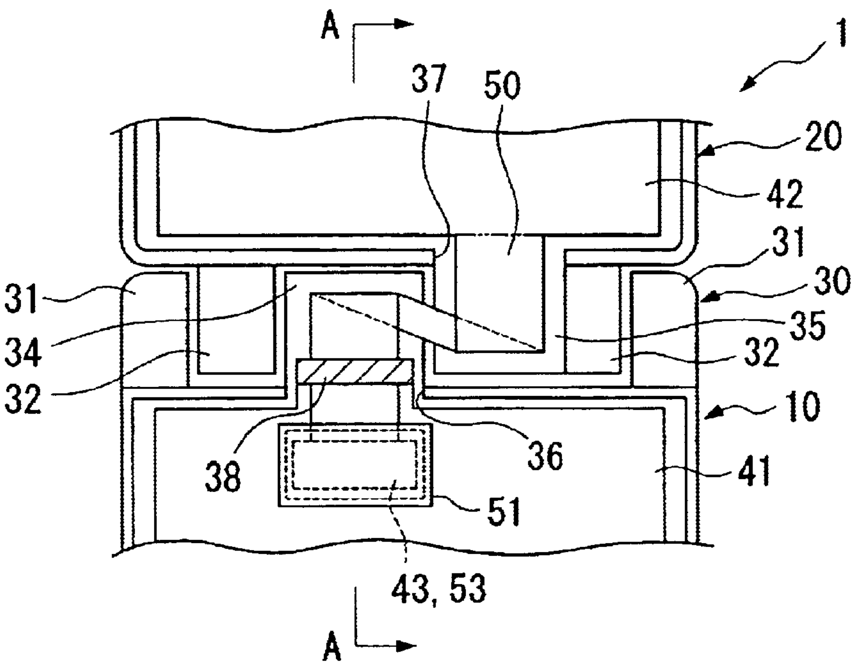
FIG. 3 is an explanatory figure showing the rear face of the cellular telephone in FIG. 1, around the hinge.

As shown in FIG. 3, circuit board 41 (hereinafter referred to simply as "board 41") is disposed inside first housing 10, with circuits for receiving signals from buttons 13 mounted thereon. Circuit board 42 (hereinafter referred to simply as "board 42") is disposed inside second housing 20, with circuits for controlling display 23 mounted thereon. These boards 41 and 42 is electrically connected together by flexible board 50 which serves as a wiring part passing through cylindrical members 34 and 35 and extending into housings 10 and 20.

Flexible board 50 is belt-shaped, with the part inserted into first housing 10 and the part inserted into second housing 20 communicating in roughly a crank shape. Flexible board 50 has been rotated one time around axis C of hinge 30 in order to be in accordance with opening or closing housings 10 and 20, then, in this state, flexible board 50 is housed inside first cylindrical member 34 and second cylindrical member 35. A connecting board 51 is provided on flexible board 50 at its board 41 end, and a connector 53 provided on connecting board 51 and a connector socket 43 provided on board 41 are mutually connected electrically. Note that flexible board 50 and board 42 is connected using solder or the like. A sealing member 54 is provided on connecting board 51, for surrounding the periphery of connector 53 and connector socket 43.

A first communicating path 36 is formed on first cylindrical member 34, communicating with the inside of first housing 10. A second communicating path 37 is formed on second cylindrical member 35, communicating with the inside of second housing 20. Flexible board 50 is introduced into housings 10 and 20 via these communicating paths 36 and 37. Board 41 has a projecting part that projects outward from first communicating path 36 into hinge 30. A holding member 38 is provided at the tip of the projecting part of board 41 for regulating relative movement of flexible board 50 against connector 53.

Figure 4:
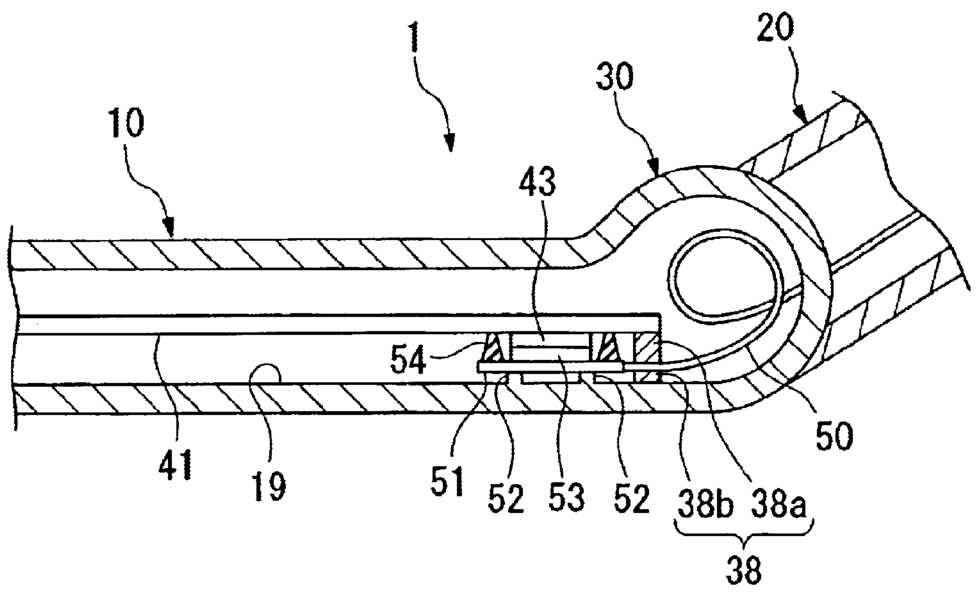
FIG. 4 is a cross-sectional view along the line A—A in FIG. 3.
Figure 5:
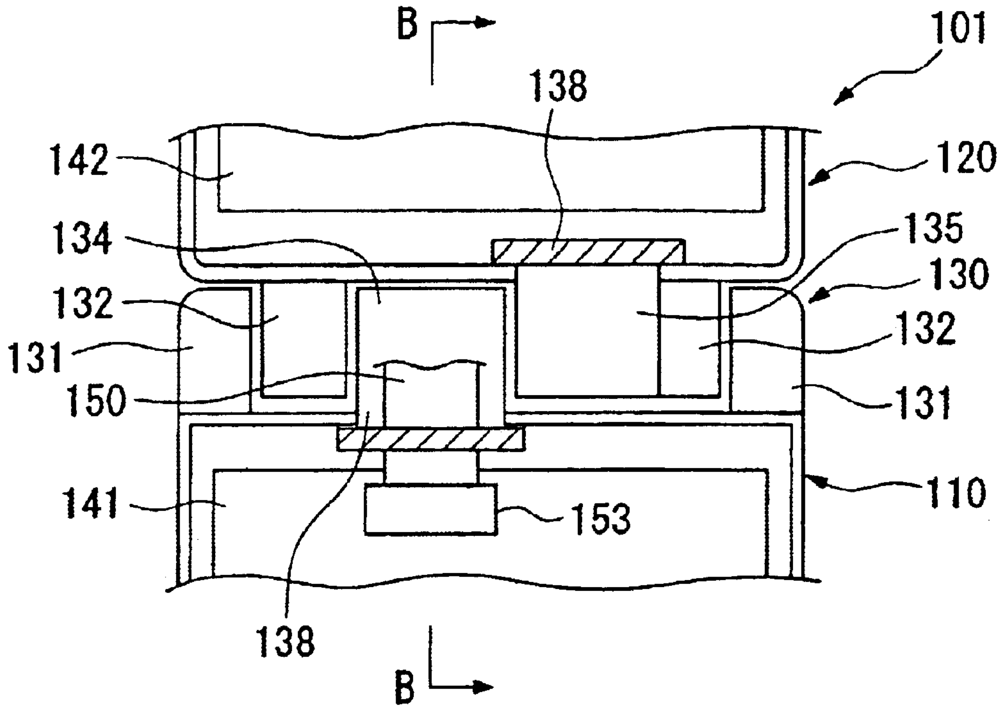
FIG. 5 Prior Art
FIG. 5 is an explanatory figure showing the rear face, corresponding to that shown in FIG. 3, of a conventional cellular telephone.
Figure 6:
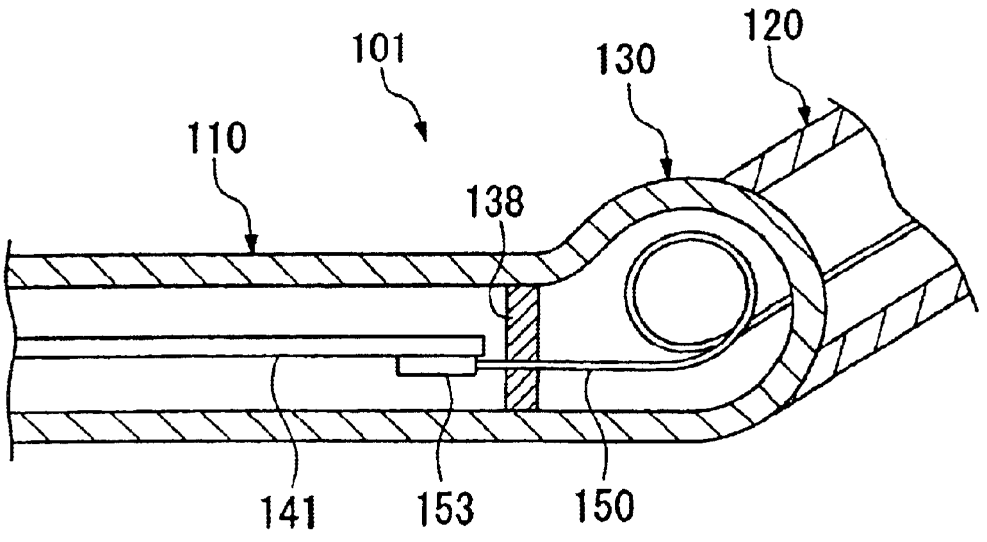
FIG. 6 Prior Art
FIG. 6 is a cross-sectional view along the line B—B in FIG. 5.

As shown in FIG. 4, connector 53 and connector socket 43 are of a type in which engagement thereof causes board 41 and connecting board 51 to face to one another (i.e., a B—B connector type). Connecting board 51 is disposed between board 41 and inner wall 19 of first housing 10. When connector 53 is disposed opposite connector socket 43 of board 41, connecting board 51 is supported to be horizontal to board 41 by beads 52 that are provided on inner wall 19. Board 41 is attached roughly horizontal to the inner wall 19 of first housing 10 and is fixed in place with a machine screw or the like not shown in the Figure. Further, board 41 presses against connector 53 and connector socket 43 in the direction of its engagement, and holds them together in a state of connection.

Sealing material 54 which surrounds connector 53 and connector socket 43 consists of an elastic material like rubber or elastic resin, such as EPDM (ethylene propylene diene monomer) for example, and is formed to project outward to on the board 41 on connecting board 51. When connector 53 and connector socket 43 are in a state of connection, sealing material 54 is pressed against and firmly contacts to board 41, thereby tightly sealing closed the area around connector 53 and connector socket 43. Elastic member 38*a* is disposed on the flexible board 50 side of board 41, on the part of board 41 that is projecting toward the inside of hinge 30. An elastic member 38*b* is disposed on inner wall 19 of first housing 10, in opposition to elastic member 38*a*, and flexible board 50 is held between these two members. These elastic members 38*a* and 38*b* consist of the same elastic material, such as rubber or elastic resin, as sealing material 54. When connector 53 and connector socket 43 are in the connected state, elastic members 38*a* and 38*b* press against flexible board 50 and hold it, fixing the relative position of flexible board 50 against connector 53. In other words, the aforementioned holding member 38 is composed of these elastic members 38*a* and 38*b*.

The effects of the present invention will be explained next.

Connector 53 on flexible board 50 is connected with connector socket 43 on board 41. In their connected state, connector 53 and connector socket 43 then firmly contacts to first housing 10. When board 41 is fixed in place to first housing 10 with a machine screw or the like, connector socket 43 on board 41 and connector 53 on connecting board 51 for flexible board 50 are pushed and fixed together in this state of connection. At the same time, sealing material 54 provided to connecting board 51 is pressed against board 41 and tightly seals the area around connector 53 and connector socket 43. Moreover, a part of flexible board 50 that is closer to hinge 30 than connector 53 is pressed and held in place by holding member 38.

In a cellular telephone 1 of the above design in which board 41 and flexible board 50 are connected, connector 53 and connector socket 43 are tightly sealed by sealing material 54 and hereby do not become wet even if water penetrates inside hinge 30. Moreover, since a part of flexible board 50 that is closer to hinge 30 than connector 53 is pressed and held in place by holding member 38, then, even if over-tension and slackening on flexible board 50 occurs during opening and closing operation of housings 10 and 20, the part of flexible board 50 that is closer to connector 53 than holding member 38 are not damaged by this over-tension and slackening. Thus, connector 53 does not become loose.

In the connector structure according to the preceding embodiment, connector 53 and connector socket 43 are connected in an arrangement such that sealing material 54, which surrounds connector 53 and connector socket 43, tightly seals the periphery of these parts. Thus, connector 53 and connector socket 43 do not get wet even if water penetrates hinge 30, hereby making it possible to prevent corrosion or shorting out.

In addition, holding member 38 fixes in place a part of flexible board 50 that is closer to the hinge 30 than to the connector 53. Thus, it is possible to prevent severed wires or poor connection due to loosening of connector 53 as a result of over-tension and slackening on flexible board 50 during opening and closing operations of housings 10 and 20.

The water resistant property of connector 53 and connector socket 43 is maintained as a result of sealing material 54. Thus, no problem occurs, even if holding member 38 gets wet. Accordingly, holding member 38 can be disposed inside hinge 30. As a result, connector 53 and connector socket 43 can be disposed near hinge 30, hereby making it possible to expand the space for disposing circuits on board 41. This, accordingly, expands flexibility in design of the circuits.

By attaching board 41 inside first housing 10, it is possible to simultaneously carry out the various operations of holding connecter 53 and connector socket 43 in a joined state, tightly sealing the area around connector 53 and connector socket 43 with sealing material 54, and fixing in place flexible board 50 with holding member 38. Thus, the number of man-hours in labor can be greatly reduced.

Note that the present invention is not limited to the embodiments described above. For example, sealing material 54 may be provided on the board 41 side. In this case, sealing material 54 and holding member 38 may be formed as a unitary component, so that the number of component parts and labor man-hours can be decreased.

In addition, a rib or the like may be formed on first housing 10 in place of elastic member 38*b* provided on the housing 10 side of holding member 38. It is also acceptable to eliminate one of elastic members 38*a* and 38*b* of holding member 38, and instead employ board 41 or first housing 10 to hold flexible board 50.

Further, a design is of course also possible in which flexible board 50 is connected using a connector, etc., on the board 42 side.

The present invention is suitably employed not only in cellular telephones, but also in portable terminal devices in general that are provided with two housings joined and electrically connected via a hinge and are electrically connected, examples thereof including digital cameras, video camcorders, notebook computers and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A connector structure comprising:

a circuit board provided in a housing and another circuit board provided in another housing, the housings connected together by a hinge;

a wiring part arranged inside of said hinge for electrically connecting said circuit boards to each other;

a connection board provided at least at one end portion of said wiring part;

a connector provided on one of said connection board and one of said circuit boards;

a connector socket electrically coupled to said connector and provided on the other of said connection board and one of said circuit boards; and a sealing member provided on one of said connection board and one of said circuit boards for encompassing said connector, wherein said sealing member contacts to the other of said connection board and one of said circuit boards for sealing the periphery of said connector and said connector socket in a state in which said connector and said connector socket are coupled together.

2. A connector structure according to claim 1, wherein said connection board is thrust against a housing wall surface so that said connector is pressed into said connector socket.

3. A connector structure according to claim 1, wherein said wiring part is a flexible printed-circuit board.

4. A portable terminal device comprising:

two housings connected together by a hinge;

a circuit board provided in a housing and another circuit board provided in another housing;

a wiring part arranged inside of said hinge for electrically connecting said circuit boards to each other;

a connection board provided at an one end portion of said wiring part;

a connector provided at one of said connection board and one of said circuit boards;

a connector socket electrically coupled to said connector and provided at the other of said connection board and one of said circuit boards; and a sealing member for sealing the periphery of said connector and said connector socket, the sealing member arranged between said connection board and said circuit board.

5. A portable terminal device comprising:

two housings connected together by a hinge;

a circuit board provided in a housing and another circuit board provided in another housing;

a wiring part arranged inside of said hinge for electrically connecting said circuit boards to each other;

a second rib arranged on a housing wall surface of one of said housings, in opposition to said first rib, a connection board provided at one end portion of said wiring part;

a connector provided on one of said connection board and one of said circuit boards;

a connector socket electrically coupled to said connector and provided on the other of said connection board and one of said circuit boards; and a sealing member provided on one of said connection board and one of said circuit boards for encompassing said connector, wherein said sealing member contacts to the other of said connection board and one of said circuit boards for sealing the periphery of said connector and said connector socket in a state in which said connector and said connector socket are coupled together.

6. A portable terminal device according to claim 5, wherein said connection board is thrust against a housing wall surface so that said connector is pressed into said connector socket.

7. A portable terminal device according to claim 5, wherein said wiring part is a flexible printed-circuit board.

8. A portable terminal device according to claim 5, further comprising:

a projecting portion that projects into said hinge at a part of said circuit board;

a first rib arranged on said projecting portion; and a second rib arranged on a housing wall surface of one of said housings, in opposition to said first rib, wherein said first and second ribs press to hold said wiring part.

9. A portable terminal device according to claim 5, wherein said portable terminal device is a cellular phone.

10. A portable terminal device according to claim 5, wherein said portable terminal device is a digital camera.

* * * * *